Figure 1:
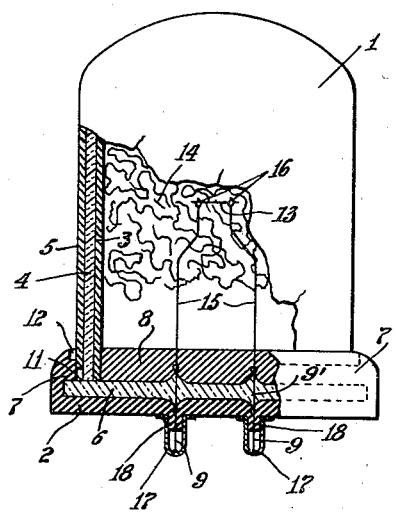

Oct. 9, 1945.  W. C. FINK  2,386,672

PHOTOFLASH LAMP

Filed Dec. 11, 1943

INVENTOR
William Charles Fink
BY
ATTORNEY

Patented Oct. 9, 1945

2,386,672

UNITED STATES PATENT OFFICE 2,386,672

PHOTOFLASH LAMP

William Charles Fink, Brooklyn, N. Y., assignor to Wabash Appliance Corporation, Brooklyn, N. Y., a corporation of New York Application December 11, 1943, Serial No. 513,823

12 Claims. (Cl. 67—31)

This invention relates to new and useful improvements in photoflash lamps and, more particularly, in envelopes for such lamps.

The object of the invention is to strengthen the envelope of a photoflash lamp so as to guard against mechanical shock and breakage even at relatively high pressures that may develop within the lamp when operated and thus make possible the construction of relatively small photoflash lamps.

Prior attempts to attain this object have resulted in photoflash lamps having glass envelopes coated with one or more films of lacquer, e. g. of cellulose acetate. It has also been suggested that the glass be replaced by a self-supporting transparent or translucent plastic, such as cellulose acetate, "Lucite," "Plastacel," "Plexi-Glas," "Bakelite BT-48-005," etc.

Lacquer-coated glass bulbs gave satisfactory results where the oxygen filling of the bulb did not exceed pressures of the order of 50 mm. rise of mercury column. Pressures of the order of one atmosphere could not be attained with safety.

Very high pressures, even several atmospheres are possible with envelopes made up of one or more self-supporting layers of plastic material. A further advantage that comes from the use of cellulose acetate, phenol-formaldehyde, urea-formaldehyde, acrylic polymers, and other transparent plastics, is that they are light in weight, are easily shaped and relatively resilient. However, envelopes made of organic plastic materials do not prevent the diffusion of gases. Within a relatively short time, in many cases a few days, the gases will diffuse in or out of the envelope, depending on the relative pressures on the two sides thereof.

The cause of this shortcoming of plastic envelopes can best be understood by considering the working principle of a photoflash lamp.

In a photoflash lamp, combustion of metal like aluminum, aluminum magnesium alloys, zirconium or the like, takes place in a combustion-supporting gas, preferably oxygen, at such speed that it can easily turn into an explosion which smashes the envelope. A carefully tested ratio of the amount of metal to the amount of the oxidizing agent must be maintained in order to give the required light output approximately 20 milli-seconds after the actuation of the igniting circuit and during a period ranging from 5 to 10 milli-seconds.

Any change in the pressure or the composition of the combustion-supporting gas, will have harmful effects on the performance of the lamp. Where such change does not make the lamp completely inoperative, which often happens, it will change the timing of the reaction and thus make the lamp useless for the photographer, or it may cause an explosion, endangering the user.

Any substantial diffusion of gases through the envelope will vary either the composition or the amount of the gas contained within the envelope. For instance, if the photoflash lamp is filled with oxygen at one atmosphere pressure, the magnitude of the pressure within the envelope will not vary as long as the lamp is used at sea level. However, if diffusion is not prevented then, after a more or less brief period, the lamp will contain not pure oxygen but also nitrogen and some of the other gases of the outside atmosphere, until finally the composition of the inside and outside atmospheres will be the same.

A further objection to plastic envelopes is that they have low softening points. The heat of the reaction when the photoflash lamp is ignited may cause the softening and then the rupture of the envelope before maximum light development is reached. The combustion-supporting gas will escape unused without contributing to the actinic light output.

Still another drawback is the difficulty, and in many cases the impossibility, of properly sealing the lead-in wires to the plastic envelope wall. The lamp will leak at the sealing-in points, thus contributing to the impairment of the combustion-supporting gas.

According to the present invention, my object is attained and the above-mentioned and other disadvantages are avoided by constructing the envelope of the lamp of a plurality of layers. At least one of the layers is of self-supporting, organic, transparent or translucent plastic material, such as those above-mentioned, and a second of an inorganic transparent material, such as glass or quartz. Preferably at least one plastic layer is provided on each side of the glass envelope. The glass will prevent the diffusion of gases and insure proper sealing of the lead-in wires and the one or more plastic layers will give the envelope the necessary strength to withstand explosion even where they are filled with oxygen to pressures of the order of one or more atmospheres.

Figure 2:
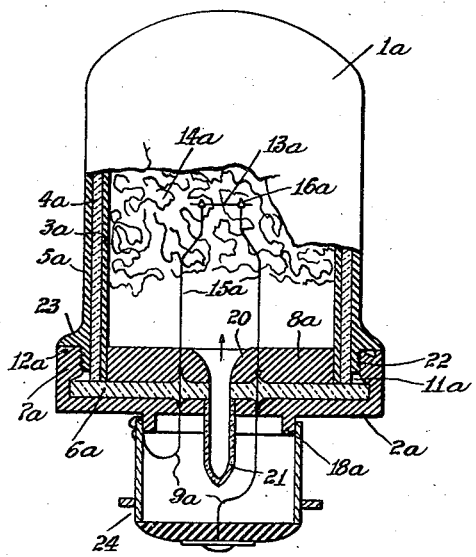
Figure 3:
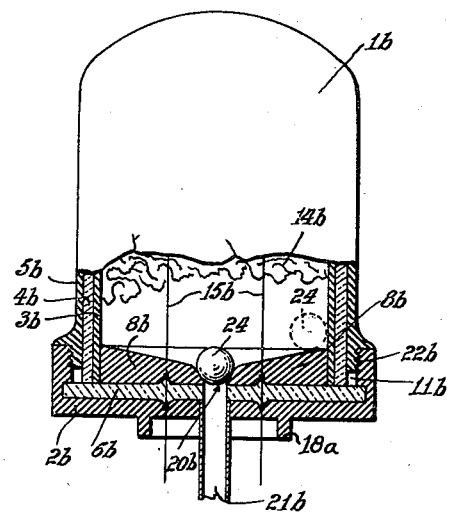

In the drawing, Figs. 1-3 are front views, partly in elevation and partly in cross-section of three embodiments of the invention.

Referring first to Fig. 1, the envelope consists of a top 1 and a bottom 2. The top 1 is formed in three self-supporting layers; 3 and 5 are self-supporting layers of transparent, organic, plastic material, inside and outside of a layer of glass 4. The top cylinder 1 is closed on one side and open on the other side. The thickness and the number of laminations or layers of plastic provided on each side of the glass envelope may vary depending on requirements. A cellulose acetate layer like 3, having a thickness of about ten thousandths of an inch, will prevent heat transfer sufficiently to guard against explosion. Even if the wall 3 should soften or crack at the point of greatest thermal shock, explosion will be prevented and complete combustion of the oxygen will be insured.

A glass envelope 4, approximately 15 mils thick, will guard against contamination of the inner atmosphere. Its relatively high softening point and great rigidity will increase the mechanical strength of the structure.

The outer plastic layer 5 may, in the above case, have a thickness of approximately 25 mils.

The bottom part 2 is also composed of three layers: the plastic bottom 2, a glass disc 6, and inner plastic layer 8. The layers 2, 6 and 8 may be of the same materials and dimensions as in the top 1. However, as shown, they may be heavier and they need not be transparent or translucent.

Two metallic lead-in wires 9 are tightly sealed into disc 6. The part 9' of the lead-in wires sealed into the glass disc 6 is preferably of so-called Dumet metal, a nickel-iron alloy having a copper sleeve which is commonly used in the electric lamp industry for such purpose.

The glass disc 6 is held within a shoulder 7 formed at the periphery of the bottom 2 between the latter and the layer 8. The inside opening of the ring 7 is such that it will contact with the lower edge of the outside plastic layer 5 when the top 1 is placed with its open end on the glass disc 6. The diameter of disc 8 is such that it fills the mouth of top 1. Glass-to-glass sealing compound is applied at the point of contact between 4 and 6. As indicated at 11, the outside layer 5, unlike the glass envelope 4 and the inside layer 3, does not reach all the way down to the glass disc 6 but leaves a ring-shaped open space to allow for the extrusion of surplus sealing compound.

In addition to the glass cement, a plastic cement is used within a groove 12 provided in the ring 7 to seal the upper part 1 to the bottom 2. Also, heat and pressure may be applied to the ring 7 to seal the two parts of the lamp together. The glass layer 4 will prevent the deforming of the envelope.

Before assembling the lamp, a combustible material 14, preferably aluminum wire containing a small amount of magnesium, is filled into the top part 1. A fine tungsten wire 13 is attached to the inner ends 15 of the beads. Beads of primer 16, preferably a mixture of zirconium magnesium and an oxidizing agent, are applied to the ends 15.

The envelope is filled with a combustion-supporting gas, such as oxygen, to pressures of the order of one or more atmospheres. The two parts 1 and 2 are placed within a sealed container, so arranged that it can be exhausted and then filled with oxygen, the glass cement being first applied to the top surface of the disc 6. After exhausting and filling to the desired oxygen pressure, the upper and lower parts 1 and 2 are pressed together and the glass cement is allowed to harden. Later the plastic cement is applied to the groove 12 and, if required, heat and pressure applied to the ring 7.

Thus the lamp may be assembled without using an open flame which might injure the plastic materials, the aluminum wire 14 and the primer 16.

Two metal nipples 17 are fitted on projections 18 of the base 2. The lower ends of the lead-in wires 9 are soldered to the nipples 17 which may be used as male plugs in connecting the lamp with a source of electric energy.

In the structure shown in Fig. 2, the bottom part has an exhaust orifice 20 communicating with a glass exhaust tube 21, attached to the disc 6a. The exhausting and the filling of the envelope may thus be effected after top 1a and bottom 2a are sealed together.

Furthermore, in this embodiment a thread 22 is formed on the inside of shoulder 7a and the corresponding portion of 5a, to insure good sealing of the top to the bottom part. Before assembling the two parts, glass cement is applied to the disc 6a, in alignment to its point of contact with 4a, and plastic cement is applied to the thread 22. When the two parts are screwed together, surplus glass cement flows into groove 11a and surplus plastic cement into groove 12a. The last-mentioned groove is formed in the top surface of the shoulder 7a and is covered by a projection 23 in the outside plastic layer 5a.

The exhausting of the envelope and its filling with oxygen, as well as the tipping-off, can be practiced on the usual machines employed in the incandescent lamp art.

The customary photoflash lamp base 24 may be cemented to the ridge 18a, formed in the bottom part 2a. The lead wires 9a are soldered to the base 24 in the usual manner.

In the embodiment shown in Fig. 3, the inner plastic layer 8b of the bottom part, has its top surface sloping down towards the exhaust orifice 20b. A ball 24, also made of plastic material, closes the orifice 20b when the lamp is in an upright position. During the exhausting and the gas-filling, the lamp is kept in an inclined position so that the ball moves into the position indicated in dotted lines, freeing the orifice 20b. When the desired gas pressure in excess of one atmosphere is attained, then the lamp is stood upright for the ball to close the orifice. Upon the removal of the pump from the tube 21b, the high pressure in the envelope will force the ball 24 into the orifice 20b, hermetically sealing the device. The exhaust tube 21b can then be sealed off in the usual way.

It will be obvious to those skilled in the art that many other modifications than those above-mentioned, can be practiced without departing from the spirit of the invention. For instance, while layers 3, 4 and 5, are shown as contacting with one-another over substantially their entire surfaces, the envelope 5 may be arranged to cover only a small part of 4 or may be eliminated.

What is claimed is:

1. In a photoflash lamp, an envelope consisting of two transparent plastic layers of the same order of thickness and each self-supporting when formed into a lamp bulb, said layers contacting with one-another over a substantial portion of their surfaces, one of said layers being of organic and the other of inorganic material, a filling of combustible material and combustion-sustaining gas within said envelope, an igniter embedded in said combustible material, and lead-in wires projecting through both layers and connected to said igniter.

2. In a photoflash lamp, an envelope consisting of an inner and an outer layer of transparent plastic material of the same order of thickness and each self-supporting when formed into a lamp bulb, said layers contacting with one-another over a substantial portion of their surfaces, the inner layer being of organic and the outer layer of inorganic material, a filling of combustible material and combustion-sustaining gas within said envelope, an igniter embedded in said combustible material and lead-in wires projecting through both layers, connected to said igniter and sealed into the inorganic layer.

3. In a photoflash lamp, an envelope consisting of three transparent plastic layers of the same order of thickness and each self-supporting when formed into a lamp bulb, said layers contacting with one-another over a substantial portion of their surfaces, one of said layers being of inorganic material and the layers contacting with both sides thereof of organic material, a filling of combustible material and combustion-sustaining gas within said envelope, an igniter embedded in said combustible material, and lead-in wires connected to said igniter and projecting through the three layers.

4. In a photoflash lamp, an envelope consisting of a transparent plastic self-supporting when formed into a lamp bulb, a layer of glass contacting with said plastic over a substantial portion of its surface, a filling of combustible material and combustion-sustaining gas within said envelope, an igniter embedded in said combustible material, and lead-in wires connected to said igniter and sealed into the glass.

5. In a photoflash lamp, an envelope consisting of two transparent plastic layers of the same order of thickness and each self-supporting when formed into a lamp bulb, a layer of glass contacting with said plastic layers over a substantial portion of both its surfaces, a filling of combustible material and combustion-sustaining gas within said envelope, an igniter embedded in said combustible material, and lead-in wires projecting through the glass and the two plastic layers and connected to said igniter.

6. In a photoflash lamp, an envelope comprising a top and a bottom part, both formed of glass having its inside and outside surfaces in contact with layers of transparent organic plastic material of the same order of thickness and each self-supporting when formed into a lamp bulb, a filling of oxygen at a pressure of the order of one atmosphere in said envelope, a filling of combustible wire in said envelope, an igniter embedded in the combustible wire, and lead-in wires for said igniter projecting through the three layers of the bottom part and sealed into the glass.

7. In a photoflash lamp, an envelope comprising a top and a bottom part, said top being a cylinder closed at one end and open at the other end and formed of glass having its inside and outside surfaces in contact with like cylinders of self-supporting transparent organic plastic material, the bottom part consisting of a glass disc to which the open end of the glass cylinder is sealed, and a lower and an upper self-supporting layer of plastic material, the lower layer having an upstanding flange within which the glass disc is held and to which the outside cylinder of the upper part is sealed, the upper layer of the bottom part resting on top of the glass disc and having substantially the same diameter as the inside diameter of the upper part, a filling of oxygen at a pressure of the order of one atmosphere in said envelope, a filling of combustible wire in said envelope, an igniter embedded in the combustible wire, and lead-in wires for said igniter projecting through the three layers of the bottom and sealed into the glass disc.

8. In a photoflash lamp, an envelope comprising a top and a bottom part, said top being a cylinder closed at one end and open at the other end and formed of glass having its inside and outside surfaces in contact with like cylinders of self-supporting transparent organic plastic material, the open end of the inside plastic cylinder terminating substantially in alignment with the open end of the glass cylinder and the corresponding end of the outside plastic cylinder terminating short of the glass cylinder, the bottom part consisting of a glass disc and a lower and an upper self-supporting layer of plastic material, the lower layer having an upstanding flange within which the glass disc is held and having an inside diameter corresponding to that of the outside diameter of the upper part, the upper layer of the bottom part resting on top of the glass disc and having substantially the same diameter as the inside diameter of the upper part, a filling of oxygen at a pressure of the order of one atmosphere in said envelope, a filling of combustible wire in said envelope, an igniter embedded in the combustible wire, lead-in wires for said igniter projecting through the three layers of the bottom and sealed into the glass disc, glass cement sealing the edge of the glass cylinder to the glass disc and overflowing into the groove formed by the shortened end of the outside cylinder and plastic cement sealing the flange to the outside cylinder.

9. In a photoflash lamp, an envelope comprising a top and a bottom part, said top being a cylinder closed at one end and open at the other end and formed of glass having its inside and outside surfaces in contact with like cylinders of self-supporting transparent organic plastic material, the outside plastic cylinder being screw-threaded near its open end, the bottom part consisting of a glass disc and a lower and an upper self-supporting layer of plastic material, the lower layer having an upstanding flange within which the glass disc is held and screw-threaded on the inside cooperating with the screw-threaded part of the outside cylinder, the upper layer of the bottom part resting on top of the glass disc and having substantially the same diameter as the inside diameter of the upper part, a filling of oxygen at a pressure of the order of one atmosphere in said envelope, a filling of combustible wire in said envelope, an igniter embedded in the combustible wire, and lead-in wires for said igniter projecting through the three layers of the bottom and sealed into the glass disc.

10. In a photoflash lamp, an envelope comprising a top and a bottom part, said top being a cylinder closed at one end and open at the other end and formed of glass having its inside and outside surfaces in contact with like cylinders of self-supporting transparent organic plastic material, the bottom part consisting of a glass disc and a lower and an upper self-supporting layer of plastic material, the open end of the glass cylinder being sealed to the glass disc and the open end of the outside plastic cylinder to the lower layer of the bottom part, the three layers of the bottom part being perforated, a glass tube communicating with the perforations in the bottom part, and lead-in wires projecting through the three layers of the bottom part and sealed into the glass disc.

11. In a photoflash lamp, an envelope comprising a top and a bottom part, said top being a cylinder closed at one end and open at the other end and formed of glass having its inside and outside surfaces in contact with like cylinders of self-supporting transparent organic plastic material, the bottom part consisting of a glass disc and a lower and an upper self-supporting layer of plastic material, the open end of the glass cylinder being sealed to the glass disc and the open end of the outside plastic cylinder to the lower layer of the bottom part, the three layers of the bottom part being perforated, a glass tube communicating with the perforations in the bottom part, lead-in wires projecting through the three layers of the bottom part and sealed into the glass disc, and a lamp base fastened to the bottom part.

12. In a photoflash lamp, an envelope comprising a top and a bottom part, said top being a cylinder closed at one end and open at the other end and formed of glass having its inside and outside surfaces in contact with like cylinders of self-supporting transparent organic plastic material, the bottom part consisting of a glass disc and a lower and an upper self-supporting layer of plastic material, the open end of the glass cylinder being sealed to the glass disc and the open end of the outside plastic cylinder to the lower layer of the bottom part, the three layers of the bottom part being perforated, the inside layer sloping towards the perforation, a ball of plastic material in the envelope and having a larger diameter than the perforation, a glass tube communicating with the perforations in the bottom part, and lead-in wires projecting through the three layers of the bottom part and sealed into the glass disc.

WILLIAM CHARLES FINK.